(12) United States Patent
Yuk et al.

(10) Patent No.: US 8,411,620 B2
(45) Date of Patent: Apr. 2, 2013

(54) METHOD OF TRANSMITTING INFORMATION FOR SUPPORTING LEGACY SYSTEM AND MULTI-CARRIER SYSTEM

(75) Inventors: Young Soo Yuk, Anyang-si (KR); Jeong Ki Kim, Sungnam-si (KR); Ki Seon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 12/920,630

(22) PCT Filed: Mar. 3, 2009

(86) PCT No.: PCT/KR2009/001043
§ 371 (c)(1),
(2), (4) Date: Sep. 2, 2010

(87) PCT Pub. No.: WO2009/110733
PCT Pub. Date: Sep. 11, 2009

(65) Prior Publication Data
US 2011/0002320 A1    Jan. 6, 2011

Related U.S. Application Data

(60) Provisional application No. 61/033,029, filed on Mar. 3, 2008, provisional application No. 61/037,300, filed on Mar. 17, 2008.

(30) Foreign Application Priority Data

Sep. 30, 2008    (KR) .................... 10-2008-0096320

(51) Int. Cl.
*H04B 7/212* (2006.01)
*H04J 3/16* (2006.01)
(52) U.S. Cl. ......... 370/328; 370/337; 370/347; 370/465
(58) Field of Classification Search .............. 370/328, 370/337, 347, 465
See application file for complete search history.

(56) References Cited

U.S. PATENT DOCUMENTS

| | | | |
|---|---|---|---|
| 2002/0144108 A1 | 10/2002 | Benantar | |
| 2005/0135318 A1 | 6/2005 | Walton et al. | |
| 2008/0081603 A1* | 4/2008 | Cho et al. | 455/422.1 |
| 2008/0285513 A1* | 11/2008 | Jung et al. | 370/329 |
| 2009/0046649 A1* | 2/2009 | Gao et al. | 370/329 |
| 2009/0116427 A1* | 5/2009 | Marks et al. | 370/328 |
| 2010/0005358 A1* | 1/2010 | Lim et al. | 714/749 |
| 2010/0292434 A1* | 11/2010 | Bergman et al. | 530/324 |
| 2011/0116485 A1* | 5/2011 | Olszewski et al. | 370/338 |
| 2012/0140730 A1* | 6/2012 | Marks et al. | 370/330 |

FOREIGN PATENT DOCUMENTS
WO    WO 2007/102697 A1    9/2007

* cited by examiner

*Primary Examiner* — Andrew Lee
(74) *Attorney, Agent, or Firm* — Birch, Stewart, Kolasch & Birch, LLP

(57) ABSTRACT

A method for transmitting information that supports a legacy system and a multi-carrier system is disclosed. The method for transmitting information supporting a legacy system includes constructing a frame structure for supporting the legacy system, and transmitting a frame header including allocation information of the frame structure to a mobile station.

11 Claims, 16 Drawing Sheets

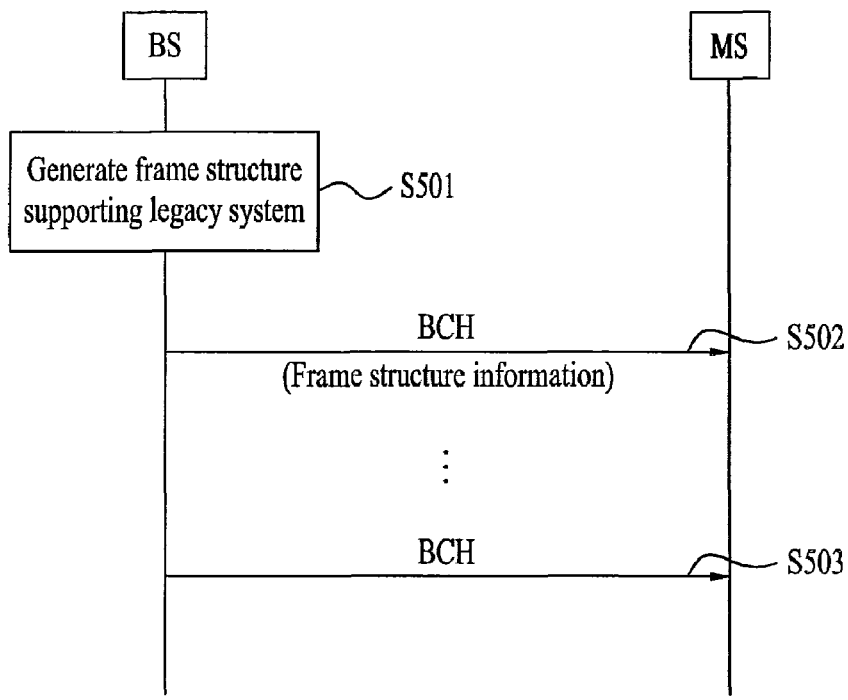
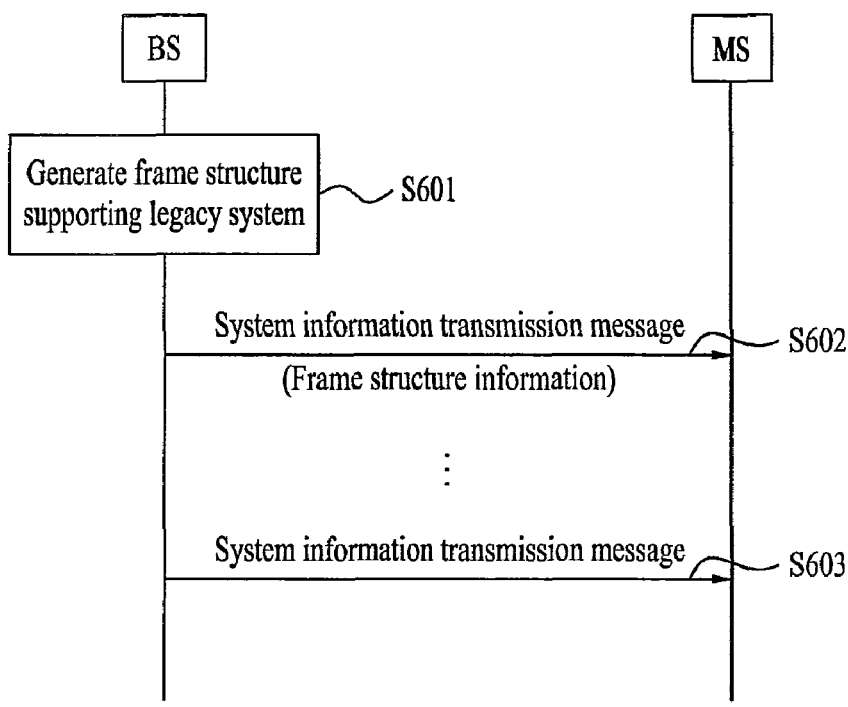

METHOD OF TRANSMITTING INFORMATION FOR SUPPORTING LEGACY SYSTEM AND MULTI-CARRIER SYSTEM

Pursuant to 35 U.S.C. §119, this application claims the benefit of Korean Patent Application No. 10-2008-0096320, filed on Sep. 30, 2008, and this application claims the benefit of earlier filing date and right of priority to Provisional U.S. Application Nos. 61/033,029, filed on Mar. 3, 2008, and 61/037,300, filed on Mar. 17, 2008, which are hereby incorporated by reference as if fully set forth herein.

BACKGROUND OF THE INVENTION

1. Field of the Invention

The present invention relates to a wireless access system, and more particularly to a variety of frame structures and a method for transmitting information using the frame structures.

2. Discussion of the Related Art

Hereinafter, a general frame structure for use in a wireless access system will be described in detail.

FIG. 1 is a structural view illustrating a frame structure for use in a broadband wireless access system (e.g., IEEE 802.16).

Referring to FIG. 1, a horizontal axis of a frame represents an Orthogonal Frequency Division Multiplexing Access (OFDMA) symbol as a time unit and a vertical axis of the frame indicates a logical number of a sub-channel as a frequency unit. In FIG. 1, one frame is divided into data sequence channels during a predetermined time period by physical characteristics. That is, one frame includes one downlink (DL) sub-frame and one uplink (UL) sub-frame. A Transmit Transition Gap (TTG) is interposed between a DL subframe and a UL subframe, and a Receive Transition Gap (RTG) is interposed between frames.

In this case, the DL subframe may include a preamble, a Frame Control Header (FCH), a DL-MAP, a UL-MAP, and one or more DL data bursts. The UL subframe may include uplink control channels, such as a HARQ ACK channel, a fast feedback channel, and a ranging sub-channel, and one or more UL data bursts.

In FIG. 1, the preamble is specific sequence data located at a first symbol of each frame and is used to perform synchronization of a mobile station with a base station or to estimate a channel state of the base station. The FCH is used to provide channel allocation information and channel code information related to the DL-MAP. The DL-MAP/UL-MAP is a media access control (MAC) message used for informing a mobile station of channel resource allocation in downlink/uplink (DL/UL). In addition, the data burst represents the unit of data which is transmitted from a base station to a mobile station or from a mobile station to a base station.

A downlink channel descriptor (DCD) which may be used in FIG. 1 is one of MAC messages indicating the physical characteristics of a DL channel and an uplink channel descriptor (UCD) is one of MAC messages indicating the physical characteristics of a UL channel.

In downlink, referring to FIG. 1, the mobile station detects the preamble transmitted from the base station and performs synchronization with the base station. Thereafter, the DL-MAP may be decoded using information acquired from the FCH. The base station may transmit scheduling information for DL or UL resource allocation to the mobile station in each frame (e.g., 5 ms) using the DL-MAP or UL-MAP message.

With the increasing development of wireless access systems, there may arise differences between a general frame structure and an advanced frame structure. In this case, it is necessary for the newly advanced system to be compatible with a general system (e.g. legacy system), resulting in the implementation of natural communication. That is, if the newly advanced broadband wireless access system (e.g., a multi-carrier system) supports a conventional wireless access system (e.g., a single-carrier system or legacy system), a new system needs to transmit information associated with the conventional system to mobile stations, such that the mobile stations can be normally operated.

For example, assuming that a sub-MAP (i.e., scheduling information for resource allocation) for use in a new system is transmitted at every DL sub-MAP, a frame structure of a legacy system may be different from that of the new system. In other words, assuming that a mobile station supporting a new system does not recognize a frame structure of the legacy system, the mobile station may sometimes not decode a sub-MAP transmitted from the new system.

Therefore, in order to allow a mobile station applied to the new system to properly utilize radio resources, it is preferable that the mobile station recognize information (e.g., bandwidth, center frequency, DL ratio with 16e, UL ratio with 16e, etc.) of a frame structure of the legacy system.

SUMMARY OF THE INVENTION

Accordingly, the present invention is directed to a method for transmitting information that supports a legacy system and a multi-carrier system that substantially obviates one or more problems due to limitations and disadvantages of the related art.

An object of the present invention is to provide an efficient frame structure.

Another object of the present invention is to provide a variety of frame structures for use in a new wireless access system (e.g., a multi-carrier system).

A further object of the present invention is to provide a method for implementing compatibility between a legacy wireless access system (e.g., a single-carrier system) and an advanced wireless access system (e.g., a multi-carrier system) according to the development of wireless access system technology. That is, the embodiments of the present invention provide a method for defining an information structure supporting a legacy system and a method for transmitting information associated with a legacy system to mobile stations.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting information supporting a legacy system includes constructing a frame structure for supporting the legacy system, and transmitting a frame header including allocation information of the frame structure to a mobile station. The allocation information may be transmitted to the mobile station via a broadcast channel (BCH) of the frame header.

In another aspect of the present invention, a method for receiving information supporting a legacy system includes receiving a frame header including allocation information of a frame supporting the legacy system from a base station, and receiving a control message through a region supporting the legacy system indicated by the frame header, wherein the allocation information is transmitted through a secondary broadcast channel (SBCH) contained in the frame header. In this case, allocation information may be transmitted through the SBCH contained in the frame header.

The allocation information may include a first indicator for indicating whether a base station supports the legacy system, first information for indicating a ratio of first sub-frames supporting the legacy system among downlink and uplink sub-frames, and bandwidth information of the first sub-frames.

The first information may be information of a ratio between the first sub-frames and second sub-frames at each of the downlink and uplink sub-frames, wherein the second sub-frames are not supporting the legacy system.

The first information may be information of a ratio between the first sub-frames and second sub-frames not supporting the legacy system among sub-frames contained in a super-frame.

The allocation information may further include a second indicator for indicating multiplexing information of uplink sub-frames from among the first sub-frames, and second information about a center frequency of the first sub-frames. The second indicator may indicate that the uplink sub-frames from among the first sub-frames is multiplexed using at least one of a Time Division Multiplexing (TDM) scheme and a Frequency Division Multiplexing (FDM) scheme, and the center frequency of the first sub-frames is represented by a relative value on the basis of a center frequency of a current carrier. In this case, the relative value may be represented in the form of position information or frequency offset information.

The allocation information may further include third information indicating the number of uplink resource blocks allocated to the first sub-frames, if the second indicator indicates that the uplink sub-frames from among the first sub-frames are multiplexed using the Frequency Division Multiplexing (FDM) scheme.

A region of the broadcast channel (BCH) may include a primary BCH (PBCH) and a secondary BCH (SBCH), and the allocation information may be transmitted to the mobile station through one of the PBCH and the SBCH.

The allocation information may be contained in a system information transfer message, and be transmitted to the mobile station.

The frame structure may be a super-frame structure, and the frame header may be a super-frame header (SFH).

The allocation information may include multi-carrier support information for supporting multiple carriers. In the system for supporting multi-carrier (MC), for a multi-carrier support mobile station (MS), MC-associated system information may be identical or similar to information defined in the legacy system.

The multi-carrier support information may include center frequency information, bandwidth information, and resource allocation ratio information. The center frequency information for multiple carriers may be represented by a relative value on the basis of center frequency information of a carrier allocated to a current MS. In this case, a relative value of the center frequency may be represented in the form of position information or frequency offset information.

A base station (BS) supporting multi-carrier may transmit MC-associated system information to the MS using a unicast message. In this case, the MC-associated support information may include center frequency information, bandwidth information, and resource allocation ratio information.

The BS may transmit multi-carrier support information through a BCH and/or a system information transmission message. In this case, the BCH may be configured in the form of a super-frame header or additional broadcast information.

The BS may directly transmit multi-carrier support information to the MS using a unicast message. For example, while the multi-carrier support MS performs initial network entry, the BS may transmit multi-carrier support information to the MS using the unicast message. In this case, the unitcast message may be a ranging response (RNG-RSP) message, a registration response (REG-RSP) message, and/or a subscriber MS basic capability response (SBC-RSP) message. In addition, upon completion of the initial network entry of the MS supporting multi-carrier, the BS may transmit multi-carrier support information to the MS supporting multi-carrier using an additional unicast message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a flowchart illustrating one example of a method for allowing a base station to transmit information of a frame structure supporting a legacy system according to an embodiment of the present invention.

FIG. 6 is a flowchart illustrating another example of a method for allowing a base station to transmit information of a frame structure supporting a legacy system according to another embodiment of the present invention.

DESCRIPTION OF SPECIFIC EMBODIMENTS

Figure 1:
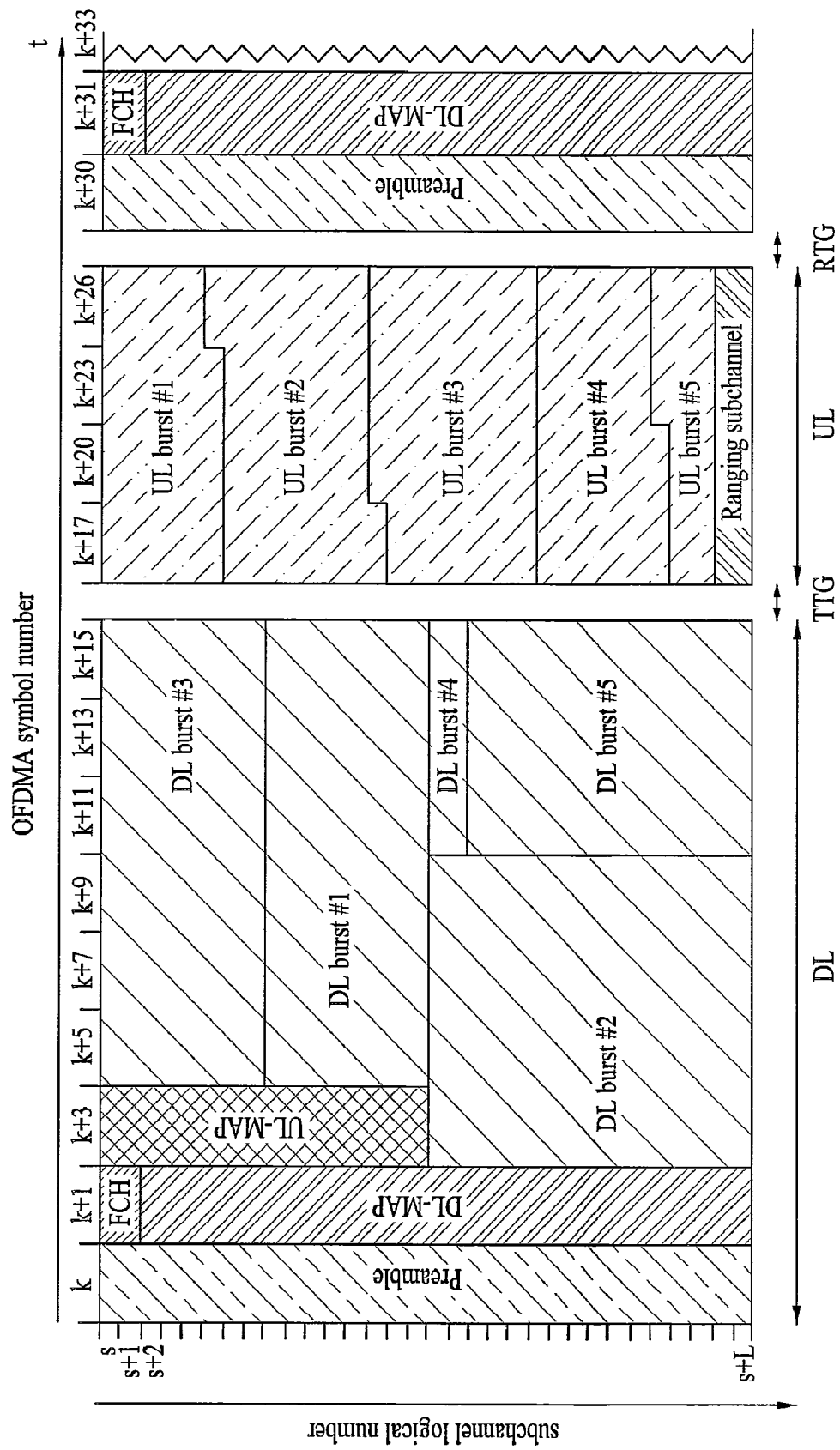
FIG. 1 is a structural view illustrating a frame structure for use in a broadband wireless access system (e.g., IEEE 802.16).

Reference will now be made in detail to the preferred embodiments of the present invention, examples of which are illustrated in the accompanying drawings. Wherever possible, the same reference numbers will be used throughout the drawings to refer to the same or like parts.

Exemplary embodiments of the present invention provide a wireless access system. The embodiments of the present invention describe a variety of frame structures for use in the wireless access system and a method for transmitting information that uses the frame structures.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may confuse the substance of the present invention, are not explained. Additionally, procedures or steps, which can be understood by those skilled in the art, are not explained as well.

In exemplary embodiments of the present invention, a description is made of a data transmission and reception relationship between a base station (BS) and a Mobile Station (MS). Herein, the term 'BS' refers to a terminal node of a network, which communicates directly with the MS. In some cases, a specific operation described as being performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'Advanced Base Station (ABS), etc. The term 'MS' may be replaced with the term 'User Equipment (UE)', 'Subscriber Station (SS')', 'Mobile Subscriber Station (MSS)', 'mobile terminal', 'Advanced Mobile Station (AMS)', etc.

A transmitter means a node that transmits voice or data service and a receiver means a node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of P802.16-2004, P802.16e-2005, and P802.16Rev2 documents which are the standards of IEEE 802.16.

Specific terms used for the exemplary embodiments of the present invention are provided to aid in understanding of the present invention. These specific terms may be replaced with other terms within the scope and spirit of the present invention.

For example, the term 'legacy system' means a generally used system, and the term 'new system' or 'advanced system' means a system described in the embodiments of the present invention. In the embodiments of the present invention, an IEEE 802.16e system (e.g., a single-carrier system) is used as an example of the legacy system, and an IEEE 802.16m system (e.g., a multi-carrier system) is used as an example of the advanced system of the present invention.

However, when a legacy system which is able to support a frequency multiplexing scheme or a time division scheme exists, the legacy system can support the multi-carrier system. In this case, a technical idea described in the embodiments of the present invention may be applied even to the legacy system.

Figure 2:
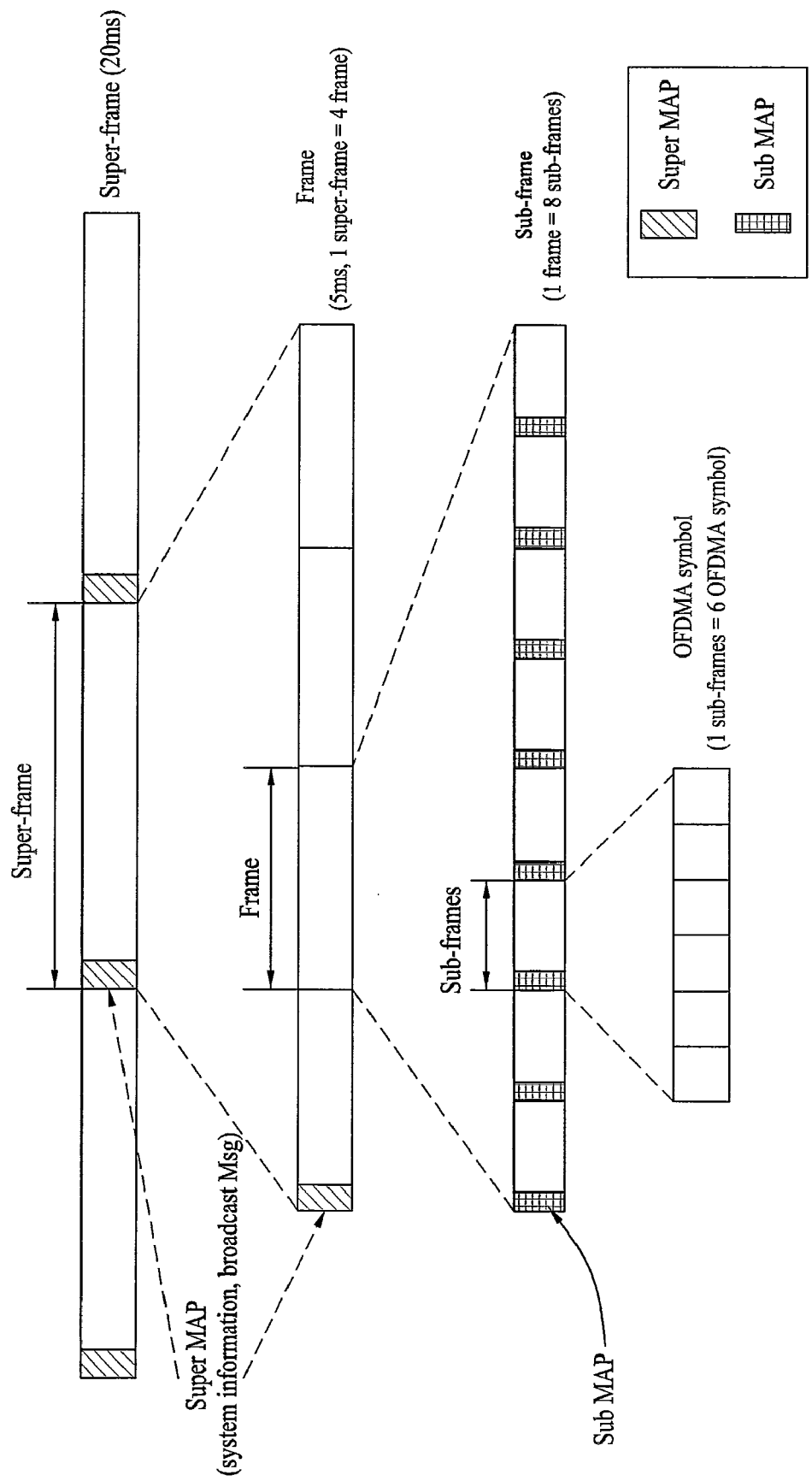
FIG. 2 is a structural view illustrating a new frame structure according to embodiments of the present invention.

FIG. 2 is a structural view illustrating a new frame structure according to embodiments of the present invention.

Referring to FIG. 2, one super-frame includes one or more frames, and one frame may include one or more sub-frames. In addition, one sub-frame may include one or more OFDMA symbols.

The lengths and the numbers of super-frames, sub-frames and symbols may be adjusted according to the requirements of a user or a system environment. In the embodiments of the present invention, the term 'sub-frame' is used. At this time, the 'sub-frame' indicates a whole lower frame structure generated by dividing one frame by a predetermined length.

In FIG. 2, it is assumed that the length of one super-frame is 20 ms and the length of one frame is 5 ms. That is, one super-frame may be composed of 4 frames. In addition, one frame has a frame structure composed of 8 sub-frames. At this time, one sub-frame may be composed of 6 OFDMA symbols. Needless to say, the above-mentioned detailed values may be changed according to a channel environment.

In FIG. 2, a super-frame MAP is present in the front side of each super-frame. The super-frame MAP may be called a super MAP or a super-frame header. For convenience of description, the super-frame MAP will hereinafter be referred to as a super MAP in the embodiments of the present invention. In addition, a sub-frame MAP is present in the front side of the sub-frame. The sub-frame map may be called a sub-MAP. The sub-MAP may include a DL sub-MAP and a UL sub-MAP.

Figure 3:
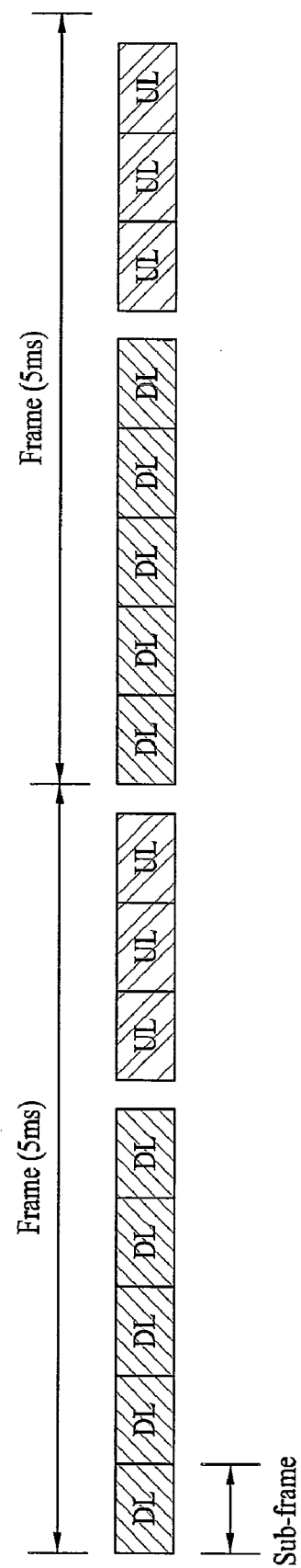
FIG. 3 is a structural view illustrating a downlink (DL) sub-frame and an uplink (UL) sub-frame according to embodiments of the present invention.

FIG. 3 is a structural view illustrating a DL sub-frame and a UL sub-frame according to embodiments of the present invention.

FIG. 3 shows a sub-frame structure in which the number of DL sub-frames is different from the number of UL sub-frames. Referring to FIG. 3, the ratio of the number of DL sub-frames to the number of UL sub-frames is set to a ratio of 5:3. That is, assuming that one frame is composed of 8 sub-frames, one frame may be comprised of 5 DL sub-frames and 3 UL sub-frames.

Therefore, a method for allocating a control channel for a downlink (DL) burst can be newly defined in the sub-frame structure proposed by the present invention. The transmitter may indicate allocation information of a control channel for a DL sub-frame through either one of a super MAP or a sub-MAP.

Figure 4:
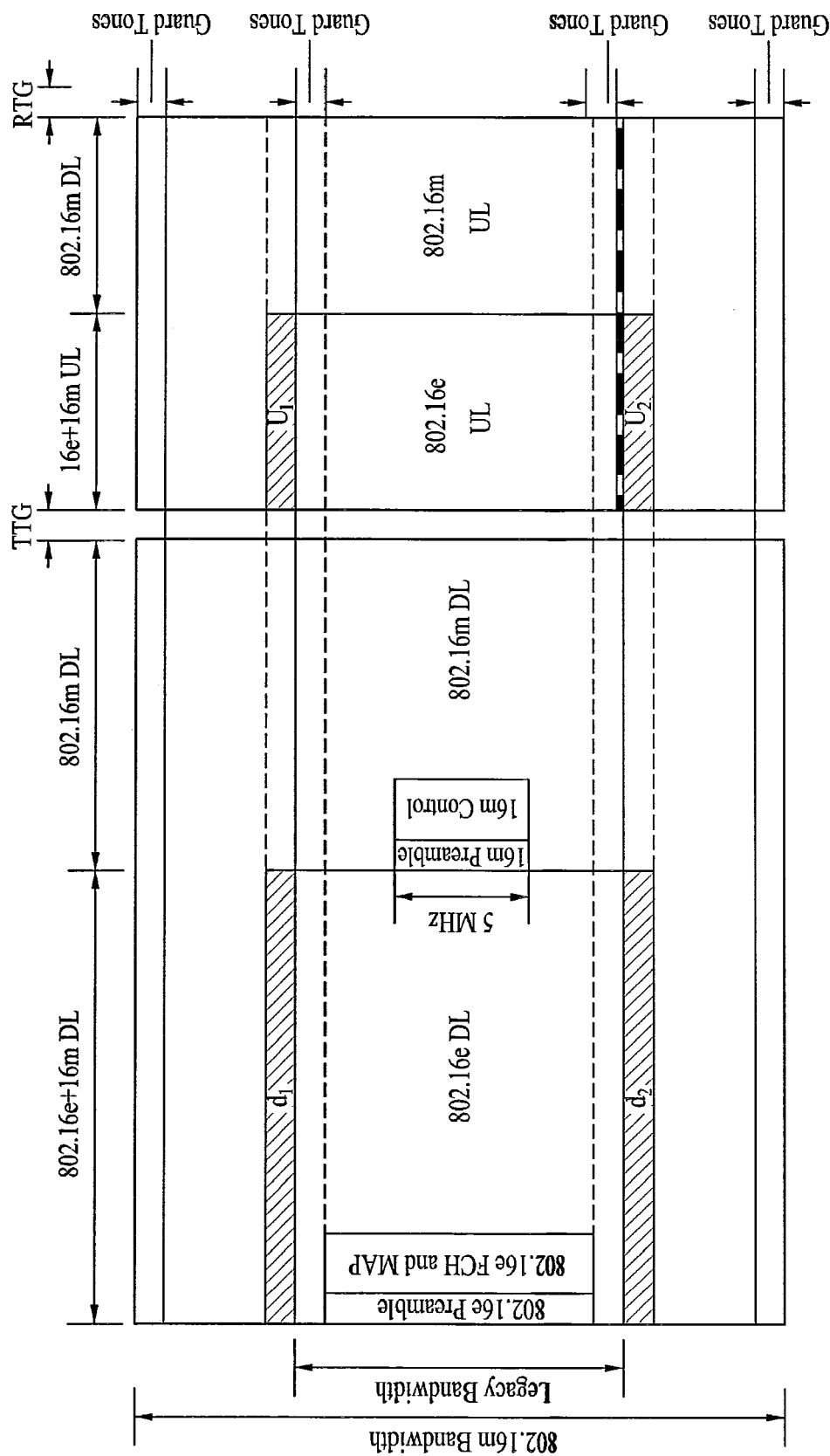
FIG. 4 is a structural view illustrating one example of a new frame structure for supporting a legacy system according to embodiments of the present invention.

FIG. 4 is a structural view illustrating one example of a new frame structure for supporting a legacy system according to the embodiments of the present invention.

Referring to FIG. 4, the legacy system (e.g., 802.16e) has the same center frequency as that of an advanced system (e.g., 802.16m), and shares symbols of a predetermined part with the advanced system.

If it is assumed that a mobile station does not recognize the frame structure of FIG. 4 when the 802.16m system transmits a sub-MAP (i.e., scheduling information for resource allocation) at every DL sub-frame, the mobile station may not decode a sub-MAP present in the '802.16e+802.16m DL' region.

Therefore, in order for the 802.16m mobile station (802.16m MS) to properly use resources of the 802.16m region, it is preferable that the mobile station previously recognize information of the 802.16e frame structure allocated to a frame shown in FIG. 4.

FIG. 5 is a flowchart illustrating one example of a method for allowing a base station to transmit information of a frame structure supporting a legacy system according to an embodiment of the present invention.

Referring to FIG. 5, a base station (BS) is able to generate a variety of frame structures. For example, if the BS supports the 802.16e standard, it generates frames in accordance with the 802.16e standard. If the BS supports the 802.16m standard, it generates frames in accordance with the 802.16m standard. In addition, if the BS supports a legacy system, a frame structure capable of supporting the legacy system can be generated. In this case, the BS may generate a frame structure of FIG. 4 as an example of a frame structure that supports the legacy system in step S501.

In step S501, the BS may generate a frame structure supporting the legacy system. At this time, the BS may pre-inform a mobile station (MS) of information (i.e., frame structure information) about the generated frame structure via a broadcast channel (BCH) in step S502.

The following Table 1 exemplarily shows a plurality of frame structure information that is transmitted to a mobile station (MS) via a BCH.

TABLE 1

| Name | Bits | Note |
| --- | --- | --- |
| Legacy system indicator | — | Legacy system indicator indicates information of whether BS supports legacy system |
| UL Multiplexing structure indicator | — | UL Multiplexing structure indicator indicates information of UL multiplexing structure when legacy system is present |
| DL/UL bandwidth of legacy system | — | |
| DL/UL center frequency of legacy system | — | |
| DL/UL ratio with legacy system | — | |
| UL resource block information for legacy | — | This means the number of UL resource blocks allocated to 16e |

TABLE 1-continued

| Name | Bits | Note |
| --- | --- | --- |
| system in FDM | | when each UL of 16e and 16m is present as FDM |

Referring to Table 1, frame structure information may include a legacy system indicator, a UL multiplexing structure indicator, a DL/UL bandwidth of a legacy system, a DL/UL center frequency of a legacy system, a DL/UL ratio with a legacy system, and UL resource block information for a legacy system in FDM. In more detail, the legacy system indicator may indicate whether a BS supports a legacy system. The UL multiplexing structure indicator may indicate information of a UL multiplexing structure when a legacy system is present. The 'UL resource block information for a legacy system in FDM' means the number of UL resource blocks that are allocated to 802.16e when UL of the 802.16e and UL of the 802.16m are allocated in Frequency Division Multiplexing (FDM).

The following Table 2 shows an exemplary format of the legacy system indicator.

TABLE 2

| Name | Size(bits) | Notes |
| --- | --- | --- |
| Legacy system indicator | 1 bit | This indicator indicates whether legacy system is present in current system 0b0 = Absence of legacy system 0b1 = Presence of legacy system |

Referring to Table 2, the legacy system indicator is composed of one bit. If the legacy system indicator is set to '0', this indicates absence of a legacy system in a current advanced system. If the legacy system indicator is set to '1', this indicates presence of a legacy system in the current advanced system.

The following Table 3 shows an example of the UL multiplexing structure indicator.

TABLE 3

| Name | Size(bits) | Notes |
| --- | --- | --- |
| UL Multiplexing structure indicator | 1 bit | This indicator indicates whether UL structure of legacy system and UL structure of 16m system are based on FDM '0b0' means that multiplexing structure of 16e or 16m system is TDM format '0b1' means that each multiplexing structure of 16e and 16m systems is FDM format |

Referring to Table 3, the UL multiplexing structure indicator may have the size of one bit. In this case, if the UL multiplexing structure indicator is set to '0', this means that each multiplexing structure of a legacy system and an advanced system is based on a Time Division Multiplexing (TDM) scheme. If the UL multiplexing structure indicator is set to '1', this means that each multiplexing structure of a legacy system and an advanced system is based on an FDM scheme.

The following Table 4 shows an example of a DL/UL ratio field (i.e., a field of 'DL/UL ratio with legacy system') of a legacy system used in the embodiments of the present invention.

TABLE 4

| Name | Size(bits) | Notes |
| --- | --- | --- |
| DL/UL ratio with legacy system | 8 or 3 bits | Each bit is mapped to each sub-frame in one frame. Among respective bits, bit #7 (MSB) means first sub-frame, bit #6 means second sub-frame, . . . , and bit #0(LSB) means the last sub-frame (i.e., eighth sub-frame). Information indicated by 1 bit indicates whether the sub-frame mapped to the 1 bit is used only for 802.16m or is used for both 802.16m and another system (e.g., 16e system) |

In Table 4, the DL/UL ratio field may have the size of 8 or 3 bits. If the DL/UL ratio field has the size of 8 bits, each bit may be mapped to each subframe in one frame. For example, 'bit #7' (MSB) means a first sub-frame, 'bit #6' means a second sub-frame, . . . , 'bit #0' (LSB) means the last sub-frame (i.e., eighth sub-frame).

In Table 4, information indicated by one bit indicates whether a sub-frame mapped to the one bit is used only for the 802.16m system or is used for both the 802.16m system and another system (e.g., 16e system). For example, if a sixth bit (bit #6) is set to '0', this means that a second sub-frame mapped to the sixth bit is used only for the 802.16m system (802.16m) or coexists with the legacy system (802.16e). If the sixth bit (bit #6) is set to '1', the second sub-frame mapped to the sixth bit is used only for the 802.16m system.

The following Table 5 shows an example of DL/UL bandwidth information of a legacy system.

TABLE 5

| Name | Size(bits) | Notes |
| --- | --- | --- |
| DL bandwidth of legacy system | 3 bits | This information indicates DL bandwidth information used in legacy system. When legacy system supports 3.5, 5, 7, 8.75, and 10 MHz, this information has the size of 3 bits, and respective values are as follows. 0b000: 3.5 MHz 0b001: 5 MHz 0b010: 7 MHz 0b011: 8.75 MHz 0b100: 10 MHz 0b101~0b111: reserved |
| UL bandwidth of legacy system | 3 bits | This information indicates UL bandwidth information used in legacy system. This information may be set to be identical to DL bandwidth in TDD system. This information may be used for FDD. When legacy system supports 3.5, 5, 7, 8.75, and 10 MHz, this information has the size of 3 bits, and respective values are as follows. 0b000: 3.5 MHz 0b001: 5 MHz 0b010: 7 MHz 0b011: 8.75 MHz 0b100: 10 MHz 0b101~0b111: reserved |

Referring to Table 5, each of DL bandwidth information of a legacy system and UL bandwidth information of a legacy system may be indicated by 3 bits.

The following Table 6 shows an example of a 'Number of UL resource blocks for legacy system' field allocated to a legacy system on the condition that an uplink (UL) sub-frame is configured in FDM.

TABLE 6

| Name | Size(bits) | Notes |
| --- | --- | --- |
| Number of UL resource blocks for legacy system | 8 bits | This field means the number of UL resource blocks allocated to legacy system, when UL sub-frame is constructed based on legacy system and FDM. |

Referring to Table 6, the 'Number of UL resource blocks' field for legacy system may have the size of 8 bits. That is, in the case where a UL sub-frame is configured based on a legacy system and an advanced system is configured based on a FDM, the 'Number of UL resource blocks' field may indicate the size of resource blocks allocated to the legacy system.

The following Table 7 shows an example of a 'DL/UL center frequency' field of legacy system for use in a legacy system.

TABLE 7

| Name | Size(bits) | Notes |
| --- | --- | --- |
| DL center frequency of legacy system | 3 bits | This field indicates DL center frequency information used in legacy system. 0b000 = Frequency identical to that of current system. Information corresponding to the remaining bits is changed according to bandwidth information supported by current system and legacy system. If (current system supports 10 MHz and legacy system supports 5 MHz), or if (current system supports 20 MHz and legacy system supports 10 MHz), 0b001 = The highest center frequency that is higher than center frequency of current system 0b010 = The lowest frequency that is lower than center frequency of current system 0b011~0b111: Reserved Else if current system supports 20 MHz and legacy system supports 5 MHz, 0b001 = The highest center frequency that is higher than center frequency of current system 0b010 = Center frequency that is located at second position from the highest center frequency higher than center frequency of current system 0b011 = Center frequency that is located at second position from the lowest center frequency lower than center frequency of current system 0b100 = The lowest center frequency that is lower than center frequency of current system 0b101~0b111: Reserved |

TABLE 7-continued

| Name | Size(bits) | Notes |
|---|---|---|
| UL center frequency of legacy system | 3 bits | This field indicates UL center frequency information for use in legacy system. This field is used for FDD. |

In Table 7, each of a field of 'DL center frequency of legacy system' (hereinafter referred to as 'DL center frequency field') and a field of 'UL center frequency of legacy system' (hereinafter referred to as 'UL center frequency field') may have the size of 3 bits. In Table 7, the DL center frequency field may indicate information of a DL center frequency for use in the legacy system.

For example, if the DL center frequency field is set to '0b000', this means that a legacy system has the same center frequency as that of the advanced system. Information corresponding to the remaining bits may be changed according to bandwidth information supported by the advanced system and the legacy system.

Assuming that the advanced system has the size of 10 MHz or 20 MHz and the legacy system has the size of 5 MHz or 10 MHz, if the DL center frequency field is set to '0b001', this means that the legacy system has the highest center frequency that is higher than that of the advanced system. If the DL center frequency field is set to '0b010', this means that the legacy system has the lowest center frequency that is lower than that of a current system. If the DL center frequency field is set to any one of 0b011~0b111, this means that the legacy system has a reserved value.

Assuming that the advanced system has the size of 20 MHz and the legacy system has the size of 5 MHz, if the DL center frequency field is set to '0b001', this means that the legacy system has the highest center frequency that is higher than that of the advanced system. If the DL center frequency field is set to '0b010', this means that the legacy system has a center frequency that is located at a second position from the highest center frequency higher than the center frequency of the advanced system. If the DL center frequency field is set to '0b011', this means that the legacy system has a center frequency that is located at a second position from the lowest center frequency lower than the center frequency of the advanced system. If the DL center frequency field is set to '0b100', this means that the legacy system has the lowest center frequency that is lower than that of the advanced system. In this case, if the DL center frequency field is set to any one of 0b101~0b111, this means that the legacy system has a reserved value.

The following Table 8 shows another structure of the center frequency field according to the embodiments of the present invention.

TABLE 8

| Name | Size(bits) | Notes |
|---|---|---|
| DL center frequency of legacy system | 32 bits | DL center frequency of legacy system (in units kHz) |
| UL center frequency of legacy system | 32 bits | UL center frequency of legacy system (in units kHz) |

Referring to Table 8, each of a DL center frequency field of a legacy system and a UL center frequency field of the legacy system may have the size of 32 bits. In this case, each center frequency field may be represented by an absolute value in units of kHz. Therefore, the center frequency value need not be limited to a specific value.

The following Table 9 shows another example of a 'DL/UL ratio' field for the legacy system for use in the embodiments of the present invention.

TABLE 9

| Name | Size (bits) | Notes |
|---|---|---|
| DL ratio with legacy system | 3 bits | This field indicates how much DL size is occupied by legacy system in units of subframe.<br>0b000 = (Legacy) 3: (16m) 2 (Case in which DL includes 5 sub-frames)<br>0b001 = (Legacy) 2: (16m) 3 (Case in which DL includes sub-frames)<br>0b010 = (Legacy) 2: (16m) 2 (Case in which DL includes 4 sub-frames)<br>0b011~0b110 = reserved or available in another case<br>0b111 = Absence of legacy system (i.e., Case in which legacy system indicator is set to '0b0') |
| UL ratio with legacy system | 3 bits | This field indicates how much UL size is occupied by legacy system in units of subframe.<br>0b000 = (Legacy) 1: (16m) 2 (Case in which UL includes 3 sub-frames)<br>0b001 = (Legacy) 2: (16m) 1 (Case in which UL includes 3 sub-frames)<br>0b010 = (Legacy) 1: (16m) 3 (Case in which UL includes 4 sub-frames)<br>0b011 = (Legacy) 2: (16m) 2 (Case in which UL includes 4 sub-frames)<br>0b100 = (Legacy) 3: (16m) 1 (Case in which UL includes 4 sub-frames)<br>0b101~0b110 = reserved or available in another case.<br>0b111 = This value indicates absence of legacy system or this value is used when UL is configured based on the legacy system and the FDM. If legacy system indicator is set '0b0', this means absence of legacy system. If legacy system indicator is set to '0b1', this means the legacy system is used according to FDM. |

In Table 9, each of 'DL ratio' field for legacy system and 'UL ratio' field for legacy system may be transmitted to a mobile station through uplink and downlink. A user may use a reserved value when an available combination can be generated at each ratio shown in Table 9.

Referring to Table 9, the DL ratio field indicates the ratio of sub-frames that are allocated to a legacy system in units of a sub-frame. In the case of a DL composed of 5 sub-frames, if the DL ratio field of the legacy system is set to '0b000', this means that the ratio of sub-frames allocated to the legacy system to other sub-frames allocated to the advanced system is set to 3:2. In the case of the DL composed of 5 sub-frames, if the above-mentioned DL ratio field is set to '0b001', the ratio of sub-frames between the legacy system and the advanced system is set to 2:3. In the case of a DL composed of 4 sub-frames, if the DL ratio field is set to '0b010', the ratio of sub-frames between the legacy system and the advanced system is set to 2:2. In addition, if the DL ratio field of the legacy system is set to any one of 0b011 to 0b110, the DL ratio field represents a reserved value or is available to another case. Also, if the DL ratio field of the legacy system is set to '0b111', this means that there is no legacy system (that is, this means a case wherein the legacy system indicator is '0b0' (See Table 2)).

The UL ratio field for legacy system indicates the ratio of sub-frames allocated to a legacy system in sub-frame units. In the case of a UL composed of 3 sub-frames, if the UL ratio field of the legacy system is set to '0b000', the ratio of sub-frames allocated to the legacy system (802.16e) to other sub-frames allocated to the advanced system (802.16m) is set to 1:2. In the case of the UL composed of 3 sub-frames, if the above-mentioned UL ratio field is set to '0b001', the ratio of sub-frames between the legacy system and the advanced system is set to 2:1. In the case of a UL composed of 4 sub-frames, if the UL ratio field is set to '0b010', the ratio of sub-frames between the legacy system and the advanced system is set to 1:3. In the case of a UL composed of 4 sub-frames, if the UL ratio field is set to '0b011', this means the ratio of 2:2. In the case of a UL composed of 4 sub-frames, if the UL ratio field is set to '0b100', this means the ratio of 3:1. In this case, if the UL ratio field of the legacy system is set to any one of 0b101 to 0b110, the UL ration field represents a reserved value or is available to another case.

In addition, if the UL ratio field of the legacy system is set to '0b111', this means that the legacy system is not supported or a UL sub-frame is configured with the legacy system according to an FDM scheme. That is, if the legacy system indicator shown in Table 2 is set to '0b0', this means that the legacy system is not present. If the legacy system indicator is set to '0b1', this means that the legacy system is utilized according to the FDM scheme.

The following Table 10 shows other examples of 'DL/UL bandwidth' fields for the legacy system.

TABLE 10

| Name | Size(bits) | Notes |
| --- | --- | --- |
| DL bandwidth of legacy system | 8 bits | DL bandwidth of legacy system (in units of 125 KHz) |
| UL bandwidth of legacy system | 8 bits | UL bandwidth of legacy system (in units of 125 KHz) |

Referring to Table 10, a 'DL bandwidth field of legacy system' field or a 'UL bandwidth field of legacy system' field has the size of 8 bits. The 'DL bandwidth field of legacy system' field indicates a DL bandwidth in units of 125 KHz. The 'UL bandwidth field of legacy system' field may indicate a UL bandwidth in units of 125 KHz.

The following Table 11 shows another example of the center frequency of the legacy system for use in the embodiments of the present invention.

TABLE 11

| Name | Size (bits) | Notes |
| --- | --- | --- |
| Direction of center frequency offset | 1 | This field indicates whether center frequency of legacy system is higher or lower than center frequency of advanced system. 0b0 = this means that center frequency of legacy system is higher than that of advanced system 0b1 = this means that center frequency of legacy system is lower than that of advanced system If center frequency of legacy system has the same value as in center frequency of advanced system, this field may be set to '1'. |
| DL center frequency of legacy system | 7 bits | This field indicates offset of DL center frequency of advanced system (in units of 125 KHz). |

TABLE 11-continued

| Name | Size (bits) | Notes |
| --- | --- | --- |
|  |  | If center frequency of legacy system has the same value as in center frequency of advanced system, this field may be set to '0'. |
| UL center frequency of legacy system | 7 bits | This field indicates offset of UL center frequency of advanced system (in units of 125 KHz). If center frequency of legacy system has the same value as in center frequency of advanced system, this field may be set to '0'. |

Referring to Table 11, a 'Direction of center frequency offset' field indicates whether a center frequency of a legacy system is higher or lower than a center frequency of an advanced system.

For example, if the 'Direction of center frequency offset' field is set to '0b0', this means that a center frequency of a legacy system is higher than that of the legacy system. If the 'Direction of center frequency offset' field is set to '0b1', this means that a center frequency of a legacy system is lower than that of the advanced system. If the center frequency of the legacy system has the same value as that of the center frequency of the advanced system, the 'Direction of center frequency offset' field may be set to '1'.

In Table 11, a 'DL center frequency of legacy system' field has the size of 7 bits, and indicates an offset value to a DL center frequency of the advanced system. In this case, the offset value is established in units of 125 KHz. If the center frequency of the legacy system has the same value as that of the center frequency of the advanced system, the offset value may be set to '0'. In addition, a 'UL center frequency of legacy system' field has the size of 7 bits and indicates an offset value to a UL center frequency of the advanced system. In this case, the offset value is set in units of 125 KHz. If the center frequency of the legacy system has the same value as that of the center frequency of the advanced system, the offset value may be set to '0'.

In Table 11, a field of 'Direction of center frequency offset' may have the size of 2 bits. In this case, if the 'Direction of center frequency offset' field (i.e., direction offset value of the center frequency) is set to '0b00', this means that the center frequency of the legacy system is higher than that of the advanced system. If the 'Direction of center frequency offset' field is set to '0b01', this means that the center frequency of the legacy system is lower than that of the advanced system. If the 'Direction of center frequency offset' field is set to '0b10', this means that the center frequency of the legacy system is located at the same position as that of the center frequency of the advanced system. In this case, a base station does not separately transmit center frequency information (i.e., DL center frequency and UL center frequency). At this time, if the 'Direction of center frequency offset' field is set to '0b11', this means that the field is set to a reserved value.

Referring to FIG. 5 again, a base station (BS) periodically transmits a broadcast channel, such that it can transmit frame structure information to a mobile station (MS). In addition, the BS can transmit a broadcast channel that includes frame structure information in a specific super-frame where an advanced system supports a legacy system, to the MS. Needless to say, the BS can transmit frame structure information to the MS at a specific sub-frame according to a channel environment or a user requirement in step S503.

FIG. 6 is a flowchart illustrating another example of a method for allowing a base station (BS) to transmit information of a frame structure supporting a legacy system according to another embodiment of the present invention.

FIG. 6 is a flowchart illustrating a method for transmitting frame structure information when the BS and the MS support the legacy system. Specifically, the method shown in FIG. 6 may be used when frame structure information cannot be easily changed.

Referring to FIG. 6, when the BS supports the legacy system, a frame structure supporting the legacy system can be generated. In this case, the BS may generate the frame structure of FIG. 4 as one example of the frame structure supporting the legacy system in step S601.

In the case where the BS generates a frame structure supporting the legacy system in step S601, the BS may previously inform the MS of frame structure information about the generated frame structure using a system information transfer message in step S602.

The BS periodically transmits the system information transfer message to the MS such that it can also transmit the frame structure information to the MS. In addition, the BS can transmit the system information transfer message including the frame structure information at a specific super-frame where the advanced system supports the legacy system in step S603.

In the embodiments of the present invention, allocation information or frame structure information may include multi-carrier support information for supporting multiple carriers (i.e., multi-carrier). For an MS supporting the multi-carrier, system information associated with the multi-carrier may have a structure that is identical or similar to that of information defined in the legacy system.

The multi-carrier support information may include center frequency information, bandwidth information, and resource allocation ratio information. In multi-carrier, the center frequency information may be represented by a relative value on the basis of center frequency information of a carrier allocated to a current MS. In this case, the relative value of the center frequency may be represented in the form of either position information or frequency offset information.

The BS supporting a multi-carrier (MC) may transmit MC-associated system information to the MS in unicast form. In this case, multi-carrier (MC) support information may include a center frequency, bandwidth information, and resource allocation ratio information.

In the embodiments of the present invention, the BS may transmit the multi-carrier (MC) support information via a broadcast channel (BCH) and/or a system information transmission message. In this case, the BCH may be configured in the form of either a super-frame header (SFH) or additional broadcast information.

In the embodiments of the present invention, the BS may directly transmit multi-carrier support information in the form of a unicast message to the MS. For example, if the MS supporting multi-carrier performs initial network entry, the BS may transmit multi-carrier support information to the MS using a unicast message. In this case, as such a unicast message, a ranging response (RNG-RSP) message, a registration response (REG-RSP) message, and/or a subscriber MS basic capability response (SBC-RSP) message may be utilized. In addition, upon completion of the initial network entry of the MS supporting multi-carrier, the BS may transmit multi-carrier support information to the MS supporting multi-carrier using an additional unicast message.

Figure 7:
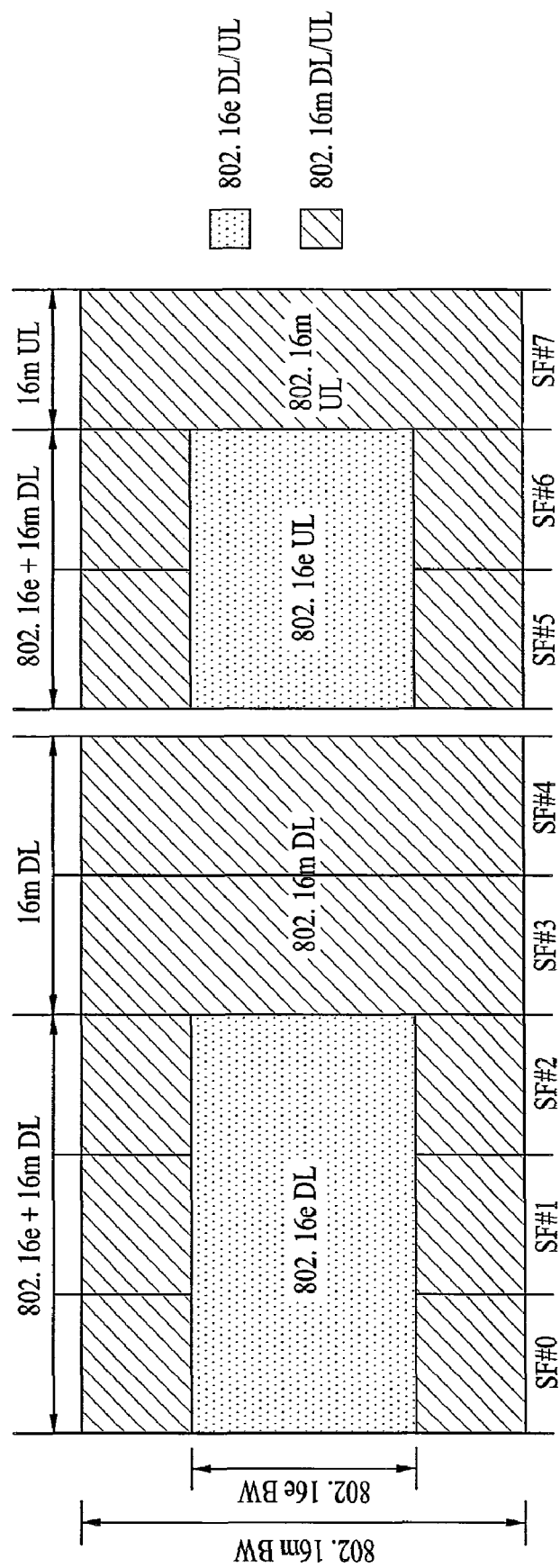
FIGS. 7 to 16 illustrate frame structures supporting a legacy system according to still other embodiments of the present invention.

FIG. 7 illustrates a frame structure supporting a legacy system according to another embodiment of the present invention.

Referring to FIG. 7, an advanced frame structure supporting the legacy system includes one Transmit Transition Gap (TTG) serving as a switch point, and has the DL/UL ratio of 5:3 in units of a sub-frame.

An advanced frame structure of the above-mentioned frame structure of FIG. 7 includes 5 contiguous DL sub-frames and 3 contiguous UL sub-frames. In order to indicate the frame structure of FIG. 7, the 'DL/UL ratio' field for legacy system may be set to '0b00011/001' as shown in Table 4.

That is, in the five contiguous DL sub-frames, the first three sub-frames are used for co-existing with a legacy system (802.16e) and the advanced system (16m), and the remaining two DL sub-frames may be used only for the advanced system (802.16m). In addition, in three UL sub-frames, the first two sub-frames are used while simultaneously co-existing with the legacy system (802.16e), and the remaining one sub-frame may be used only for the advanced system (802.16m).

Figure 8:
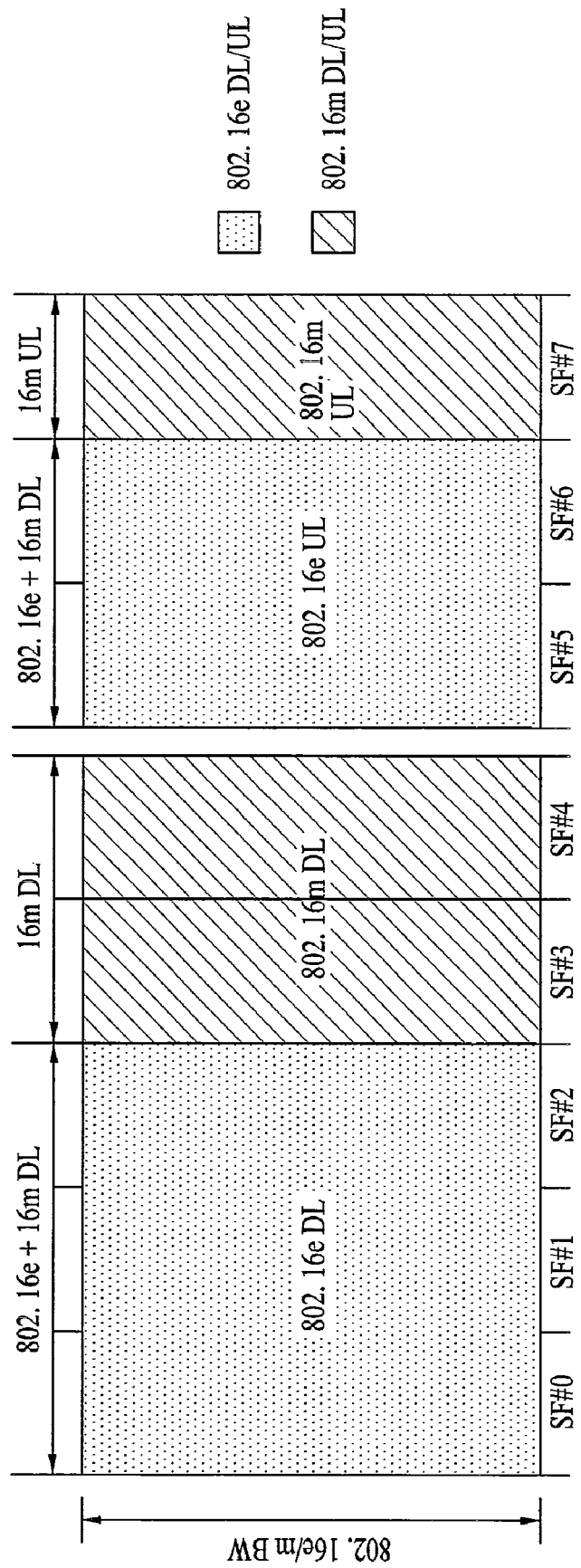

FIG. 8 illustrates a frame structure supporting a legacy system according to another embodiment of the present invention.

Referring to FIG. 8, in the case where the advanced system (802.16m) supports the legacy system (802.16e), a bandwidth of 802.16e system is identical to a bandwidth of 802.16m system at DL sub-frames.

In other words, the first three DL sub-frames may be allocated to the 802.16e system and the remaining two DL sub-frames may be allocated to the 802.16m system. In addition, the first two UL sub-frames may be used for the 802.16e system, and the remaining one UL sub-frame may be used for the 802.16m system. In this case, the DL/UL ratio of the legacy system may be set to '0b00011/001' (See Table 4).

Figure 9:
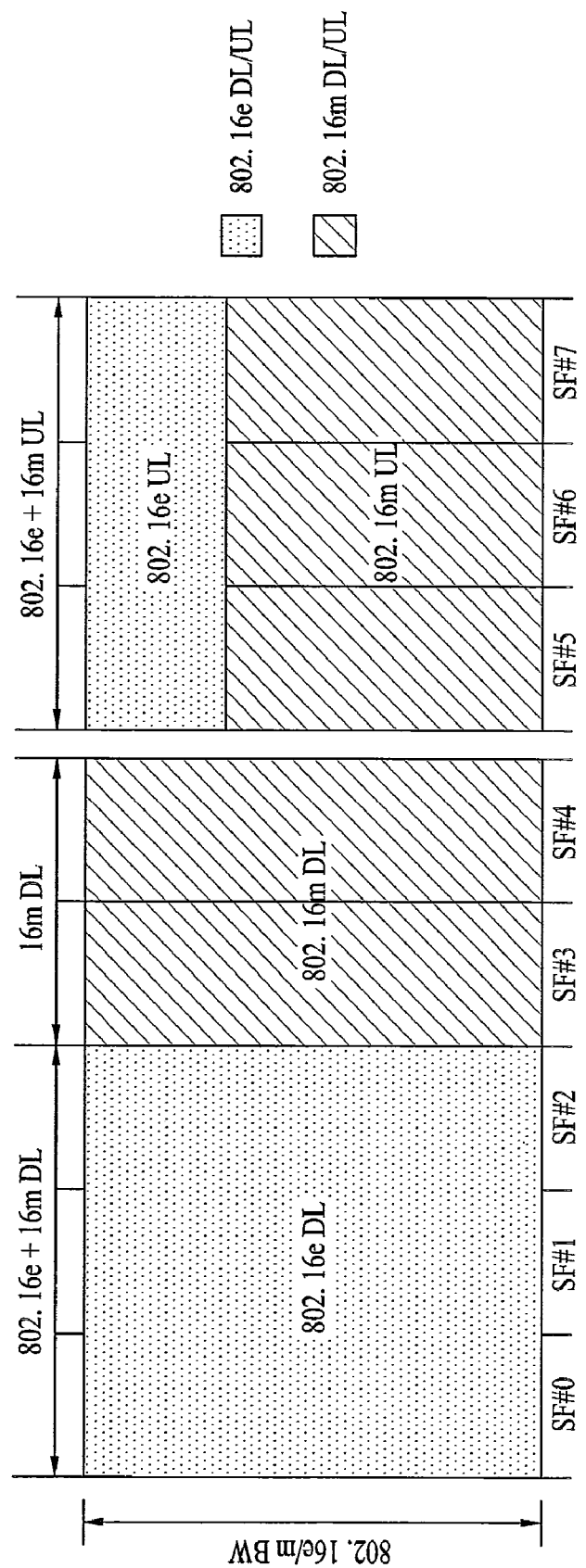

FIG. 9 illustrates a frame structure supporting a legacy system according to another embodiment of the present invention.

Referring to FIG. 9, a frame structure for use in DL sub-frames is identical to that of FIG. 8. Accordingly, the description of a DL frame structure reference may be made to FIG. 8. However, only a UL sub-frame structure of FIG. 9 is different from that of FIG. 8. In FIG. 9, each UL sub-frame is multiplexed using the FDM scheme.

FIG. 9 shows a frame structure used when a sub-frame structure of the 802.16e system coexists with a sub-frame structure of the 802.16m system using the FDM format. In this case, the DL/UL ratio of the legacy system may be set to '0b00011/000' (See Table 4).

Figure 10:
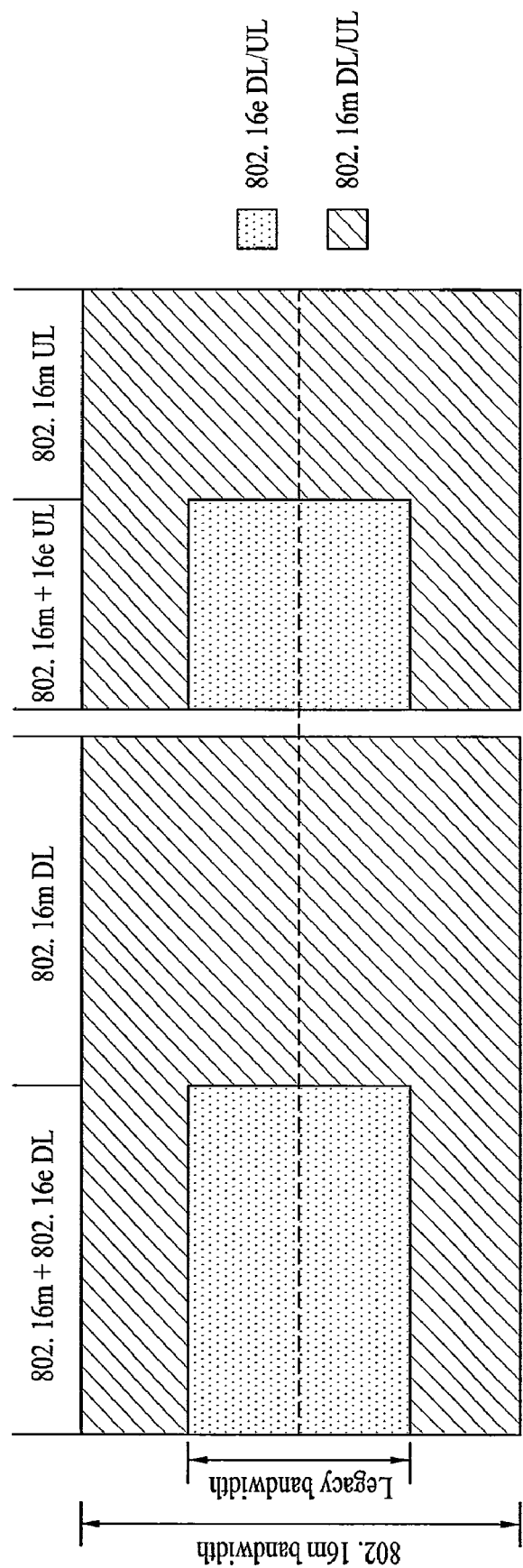

FIG. 10 illustrates a frame structure supporting a legacy system according to another embodiment of the present invention.

Referring to FIG. 10, the legacy system structure may have the same center frequency as that of the advanced system structure. At this time, in order to indicate the frame structure shown in FIG. 10, Table 7 and Table 11 may be used. For example, in the case of using the fields shown in Table 7, the DL center frequency value of the legacy system may be set to '0b000' irrespective of the bandwidth size. Also, in the case of using Table 10, a direction offset value of the center frequency may be set to '1', and an offset value of the center frequency of DL sub-frames may be set to '0'.

Figure 11:
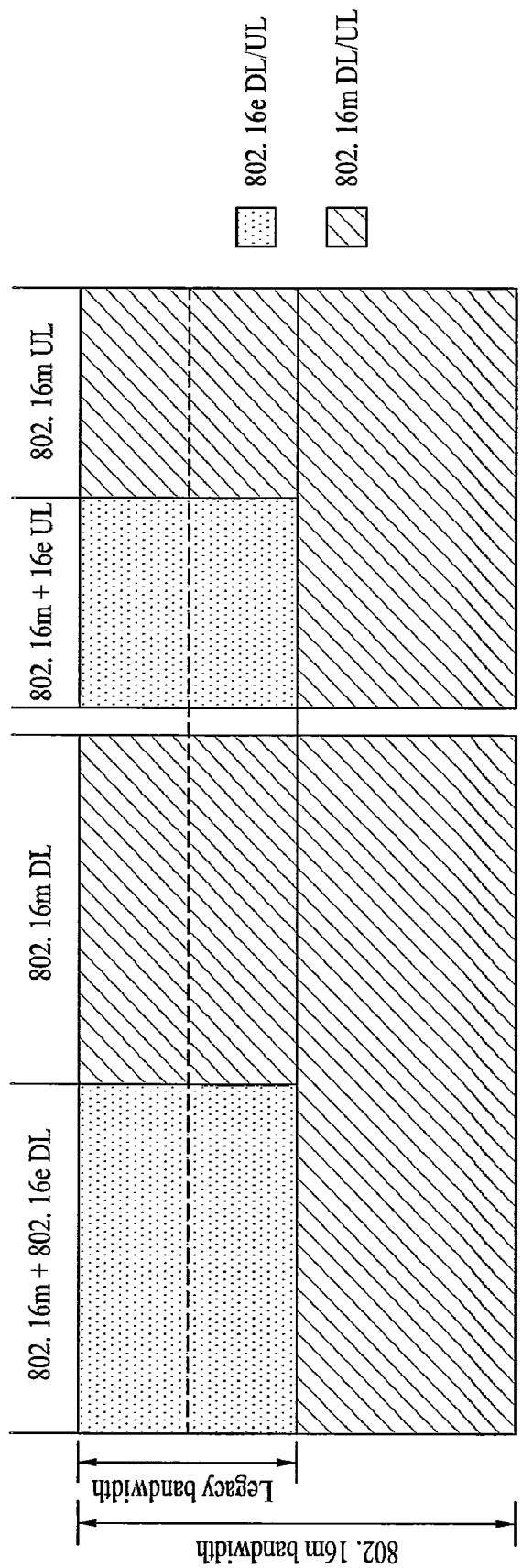

FIG. 11 illustrates a frame structure supporting a legacy system according to another embodiment of the present invention.

In FIG. 11, it is assumed that the bandwidth of the legacy system (802.16e) is set to half the bandwidth of the advanced system (802.16m). For example, FIG. 11 shows one case in which the 802.16m system has a bandwidth of 20 MHz and the 802.16e system has a bandwidth of 10 MHz, or shows the other case in which the 802.16m system has a bandwidth of 10 MHz and the 802.16e system has a bandwidth of 5 MHz.

FIG. 11 shows one example in which the center frequency of the legacy system is located above the center frequency of the advanced system. Referring to Table 7, the DL center frequency of the legacy system may be set to '0b001'.

In addition, FIG. 11 illustrates the center frequency of the legacy system using Table 11. For example, the 'Direction of center frequency offset' field shown in Table 11 may be set to '0'. In this case, assuming that the advanced system has a bandwidth of 20 MHz and the legacy system has a bandwidth of 10 MHz, a DL center frequency value of the legacy system may be set to '0b0101000' (0.125×40=5 MHz). Assuming that the advanced system has a bandwidth of 10 MHz and the legacy system has a bandwidth of 5 MHz, a DL center frequency value of the legacy system may be set to '0b0010100' (0.125×20=2.5 MHz).

Figure 12:
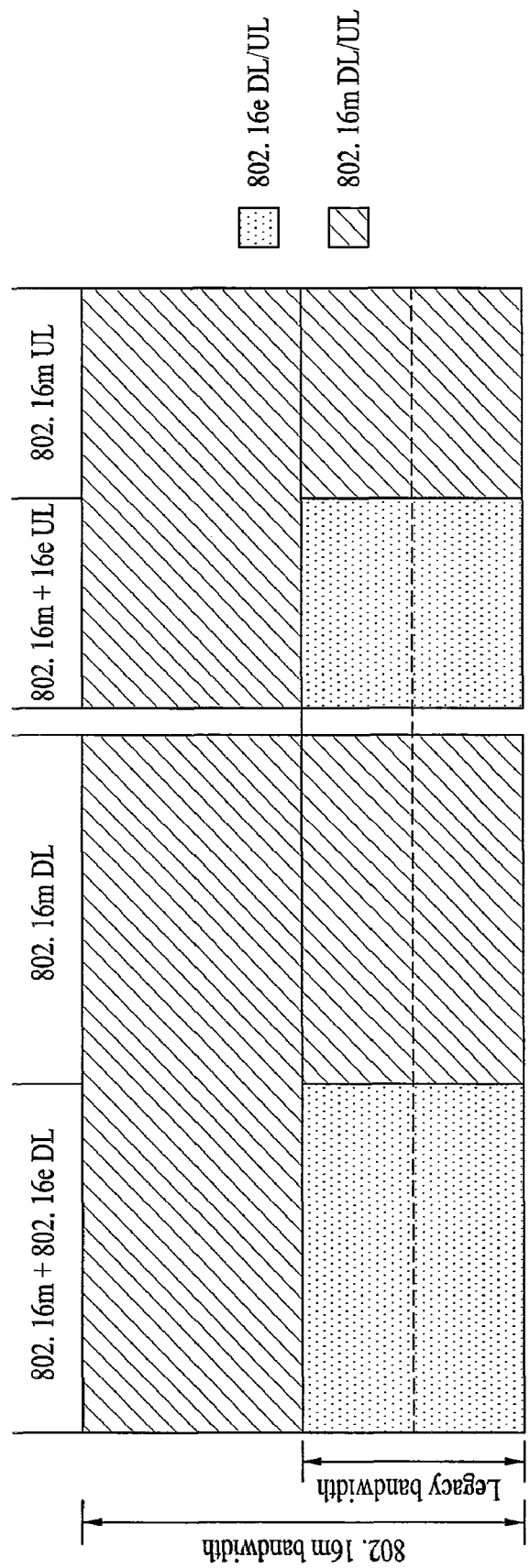

FIG. 12 illustrates a frame structure supporting a legacy system according to another embodiment of the present invention.

In FIG. 12, it is assumed that the bandwidth of the legacy system (802.16e) is set to half the bandwidth of the advanced system (802.16m). For example, FIG. 12 shows one case in which the advanced system (802.16m) has a bandwidth of 20 MHz and the legacy system (802.16e) has a bandwidth of 10 MHz, or shows the other case in which the advanced system (802.16m) has a bandwidth of 10 MHz and the legacy system (802.16e) has a bandwidth of 5 MHz.

FIG. 12 shows that the center frequency of the legacy system is located below the center frequency of the advanced system. Referring to Table 7, the DL center frequency of the legacy system may be set to '0b010'.

In addition, FIG. 12 illustrates the center frequency of the legacy system using Table 11. For example, the 'Direction of center frequency offset' field shown in Table 11 may be set to '1'. In this case, assuming that the advanced system has a bandwidth of 20 MHz and the legacy system has a bandwidth of 10 MHz, a DL center frequency value of the legacy system may be set to '0b0101000' (0.125×40=5 MHz). Assuming that the advanced system has a bandwidth of 10 MHz and the legacy system has a bandwidth of 5 MHz, a DL center frequency value of the legacy system may be set to '0b0010100' (0.125×20=2.5 MHz).

Figure 13:
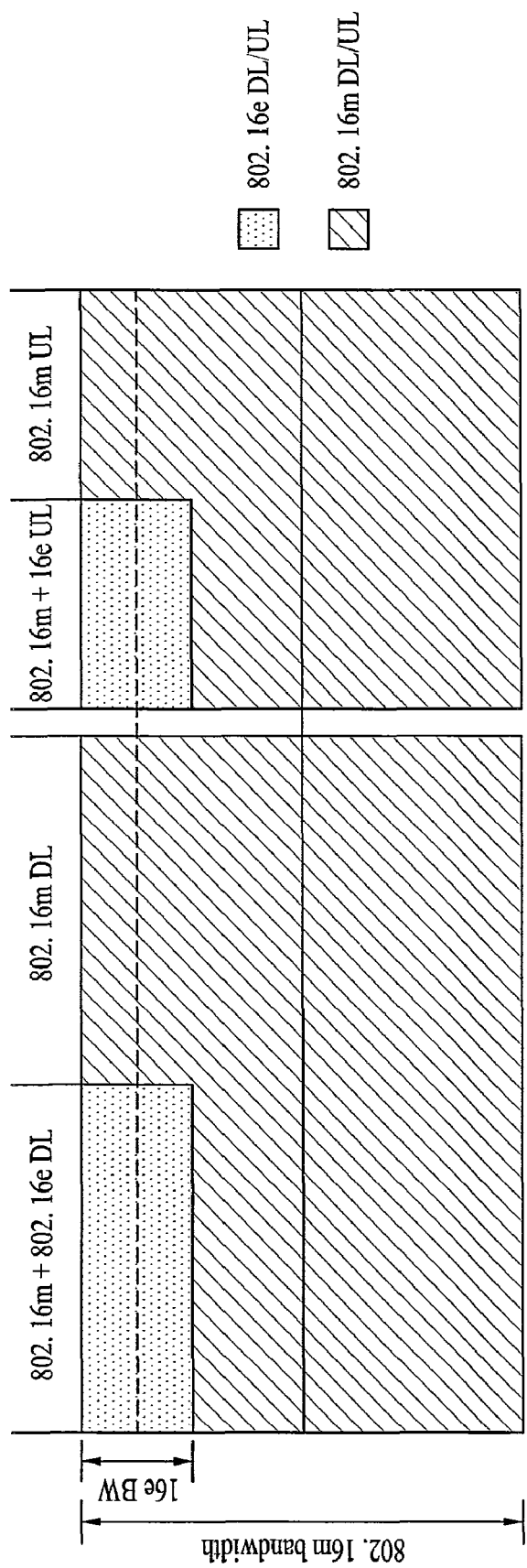

FIG. 13 illustrates a frame structure supporting a legacy system according to another embodiment of the present invention.

In FIG. 13, it is assumed that the bandwidth of the legacy system (802.16e) is set to a quarter (¼) of the bandwidth of the advanced system (802.16m). For example, FIG. 13 shows one case in which the advanced system (802.16m) has a bandwidth of 20 MHz and the legacy system (802.16e) has a bandwidth of 5 MHz. In the bandwidth size shown in FIG. 13, the center frequency of the legacy system may be located on the uppermost part of the bandwidth. In this case, as can be seen from Table 7, the center frequency field of the legacy system may be set to '0b001'.

In addition, FIG. 13 shows the center frequency field of the legacy system using Table 11. For example, the center frequency direction offset value of the 'Direction of center frequency offset' field shown in Table 11 may be set to '0'. In this case, assuming that the advanced system has a bandwidth of 20 MHz and the legacy system has a bandwidth of 5 MHz, a DL center frequency offset value of the legacy system may be set to '0b0111100' (0.125×60=7.5 MHz).

Figure 14:
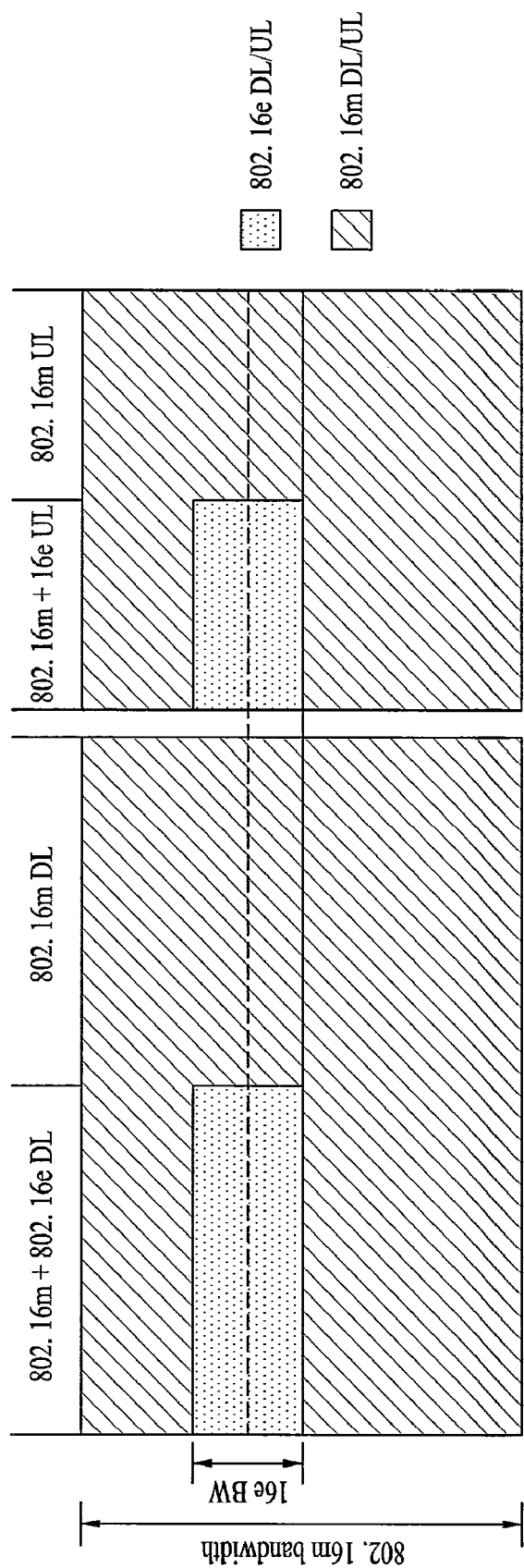

FIG. 14 illustrates a frame structure supporting a legacy system according to another embodiment of the present invention.

In FIG. 14, it is assumed that the bandwidth of the legacy system (802.16e) is set to a quarter (¼) of the bandwidth of the advanced system (802.16m). For example, FIG. 14 shows one case in which the advanced system (802.16m) has a bandwidth of 20 MHz and the legacy system (802.16e) has a bandwidth of 5 MHz. In the bandwidth size shown in FIG. 14, the center frequency of the legacy system may be located at a second position from the uppermost part of the bandwidth. In this case, as can be seen from Table 7, the center frequency field of the legacy system may be set to '0b010'.

In addition, FIG. 14 shows the center frequency field of the legacy system using Table 11. For example, the 'Direction of center frequency offset' field shown in Table 11 may be set to '0'. In this case, assuming that the advanced system has a bandwidth of 20 MHz and the legacy system has a bandwidth of 5 MHz, a DL center frequency offset value of the legacy system may be set to '0b0010100' (0.125×20=2.5 MHz).

Figure 15:
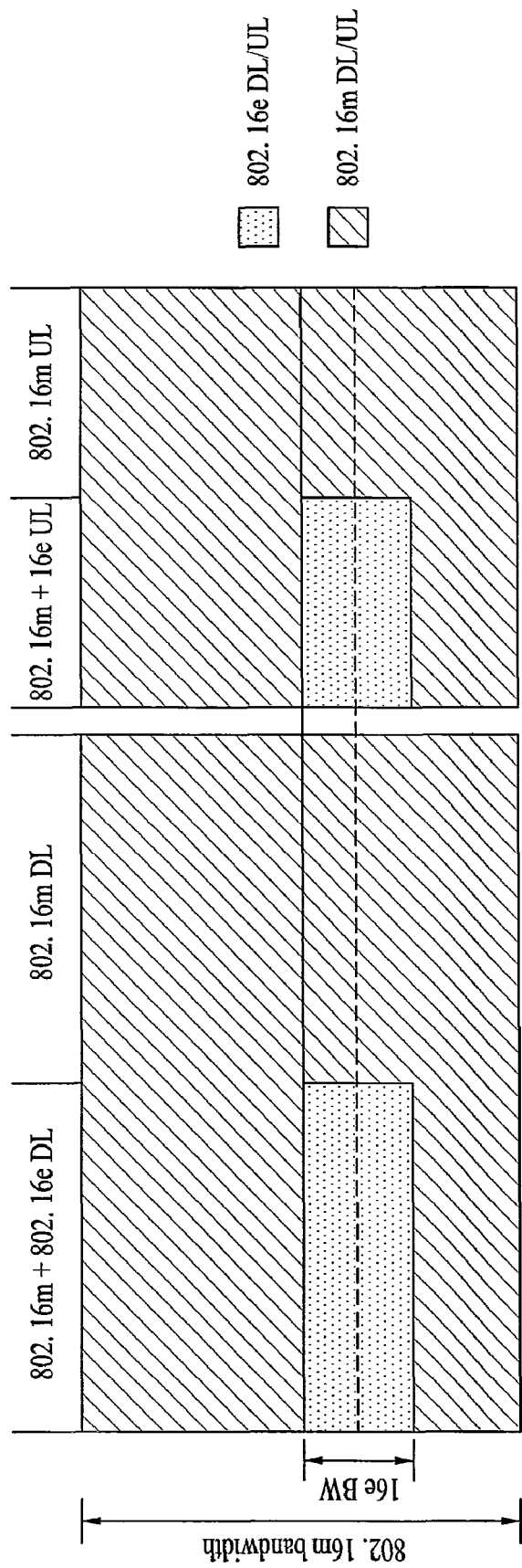

FIG. 15 illustrates a frame structure supporting a legacy system according to another embodiment of the present invention.

In FIG. 15, it is assumed that the bandwidth of the legacy system (802.16e) is set to a quarter (¼) of the bandwidth of the advanced system (802.16m). For example, FIG. 15 shows one case in which the advanced system (802.16m) has a bandwidth of 20 MHz and the legacy system (802.16e) has a bandwidth of 5 MHz. In the bandwidth size shown in FIG. 15, the center frequency of the legacy system may be located at a second position from the lowermost of the bandwidth. In this case, as can be seen from Table 7, the center frequency field of the legacy system may be set to '0b011'.

In addition, FIG. 15 shows the center frequency field of the legacy system using Table 11. For example, the 'Direction of center frequency offset' field shown in Table 11 may be set to '1'. In this case, assuming that the advanced system has a bandwidth of 20 MHz and the legacy system has a bandwidth of 5 MHz, a DL center frequency offset value of the legacy system may be set to '0b0010100' (0.125×20=2.5 MHz).

Figure 16:
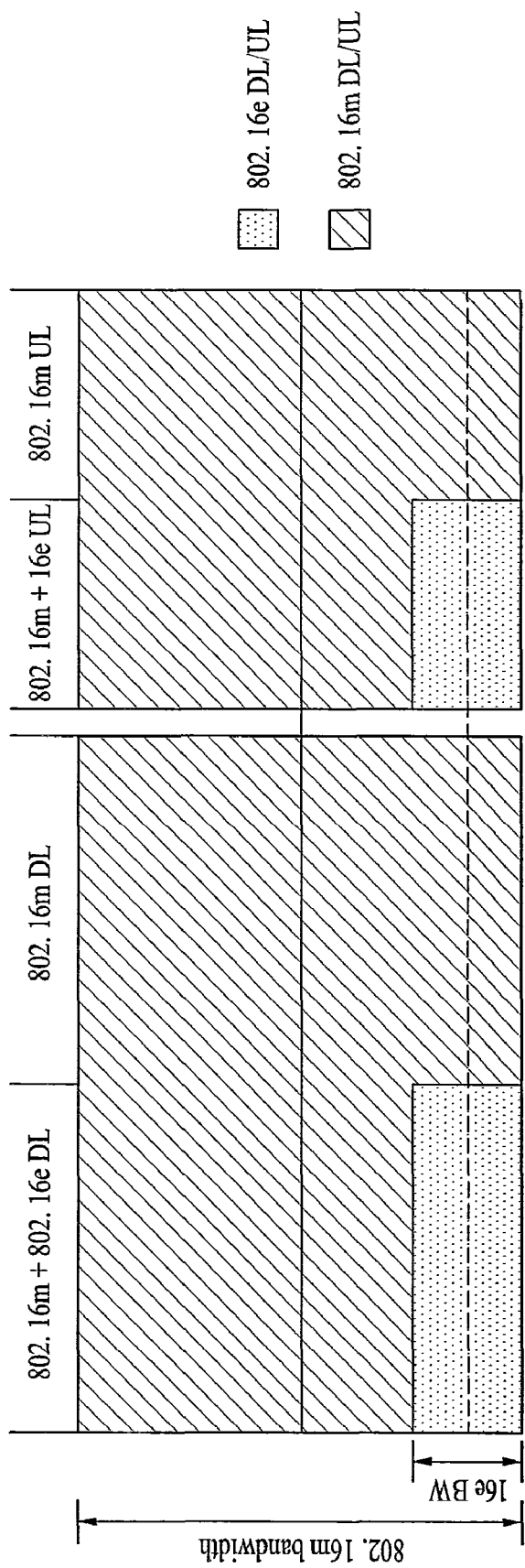

FIG. 16 illustrates a frame structure supporting a legacy system according to another embodiment of the present invention.

In FIG. 16, it is assumed that the bandwidth of the legacy system (802.16e) is set to a quarter (¼) of the bandwidth of the advanced system (802.16m). For example, FIG. 16 shows one case in which the advanced system (802.16m) has a bandwidth of 20 MHz and the legacy system (802.16e) has a bandwidth of 5 MHz. In the bandwidth size shown in FIG. 16, the center frequency of the legacy system may be located at the lowermost part of the bandwidth. In this case, as can be seen from Table 7, the center frequency field of the legacy system may be set to '0b100'.

In addition, FIG. 16 may show the center frequency field of the legacy system using Table 11. For example, the 'Direction of center frequency offset' field shown in Table 11 may be set to '1'. In this case, assuming that the advanced system has a bandwidth of 20 MHz and the legacy system has a bandwidth of 5 MHz, a DL center frequency offset value of the legacy system may be set to '0b0111100' (0.125×60=7.5 MHz).

Figure 17:
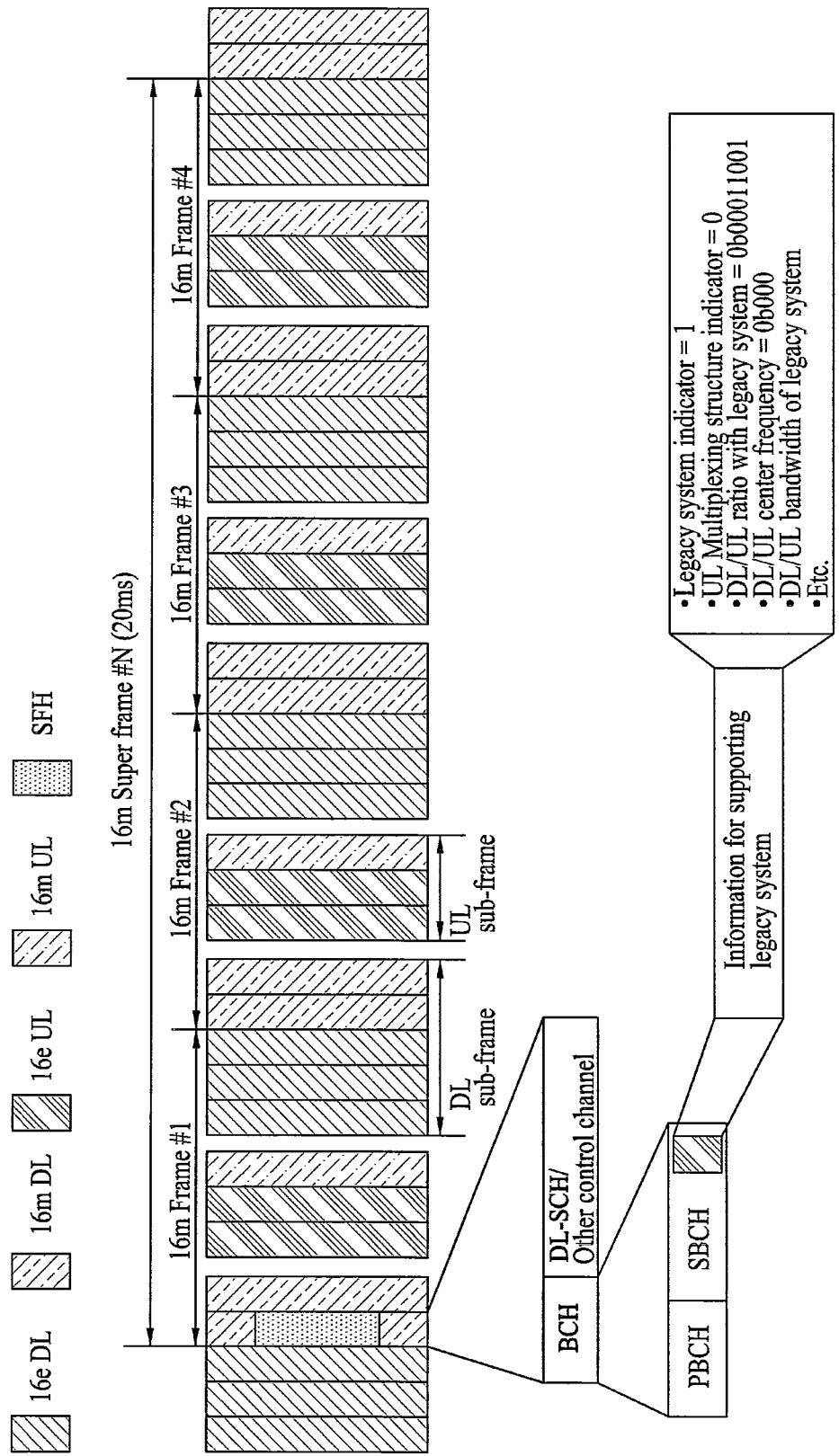
FIG. 17 is a flowchart illustrating a method for transmitting frame structure information according to a further embodiment of the present invention.

FIG. 17 is a flowchart illustrating a method for transmitting frame structure information according to a further embodiment of the present invention.

In FIG. 17, the super-frame may have the structure shown in FIG. 2 or FIG. 3. In this case, the allocation ratio between a DL sub-frame and a UL sub-frame (i.e., DL/UL ratio) may be set to 5:3. In addition, the ratio between a DL sub-frame (i.e., 16e DL) supporting a legacy system and a DL sub-frame (i.e., 16m DL) supporting only an advanced system is denoted by 3:2. Further, FIG. 17 shows one case in which the ratio between a UL sub-frame (i.e., 16e UL) supporting a legacy system and a UL sub-frame (i.e., 16m UL) supporting an advanced system is denoted by 2:1.

A super frame header (SFH) may be allocated to a first sub-frame of the super-frame. The SFH may include a BCH and a DL scheduling channel (DL-SCH) to which other control channels are allocated. In this case, frame structure information associated with the legacy system may be transmitted to a mobile station (MS) through an SFH that is transmitted at every super-frame period (e.g., 20 ms).

Referring to FIG. 17, the BCH may include a Primary BCH (PBCH) and a Secondary BCH (SBCH). At this time, it is preferred that the frame structure information be transmitted to the MS via the SBCH. Needless to say, the frame structure information may be transmitted via a PBCH according to user requirements or channel environments.

In FIG. 17, the DL/UL ratio field (i.e., 'DL/UL ratio with legacy system' field) serving as the frame structure information transmitted via the SBCH may be set to '0b00011/001' by referring to Table 4. Otherwise, referring to Table 9, the DL/UL ratio field may be set to '0b000' and the UL ratio field may be set to '0b001'.

In addition, the center frequency of the legacy system is identical to that of the advanced system, such that the DL/UL center frequency may be set to '0b000' (See Table 7). Further, the DL/UL bandwidth is set to be identical to the center frequency of the advanced system.

The above-mentioned center frequency information structure or the bandwidth information structure has described various embodiments in which the advanced system is used along with the legacy system. However, even other embodiments, each of which uses the center frequency information structure or the bandwidth information, may be used in the same manner as in the above-mentioned embodiment in which the advanced system is used along with the legacy system, or may be changed and be used in a similar way to the above-mentioned embodiment.

For example, a multi-carrier support system (i.e., a BS or system that uses a plurality of center frequencies), for the MS supporting multi-carrier, needs to transmit MC-associated information (PHY & MCA) to the MS. In this case, physical information such as center frequency information or bandwidth information for use in the advanced system supporting multi-carrier may have the same or similar structure as information defined for the legacy system.

In the embodiments of the present invention, a BCH or a system information transmission message has been used to transmit specific information (i.e., multi-carrier support information) for the multi-carrier support system to mobile stations (MSs). A broadcast channel (BCH) includes a Primary BCH (PBCH) and a Secondary BCH (SBCH). In addition, the system information transmission message includes a Downlink Channel Descriptor (DCD) and an Uplink Channel Descriptor (UCD).

In the case where the BS transmits multi-carrier support information either in BCH or in broadcast form, the multi-carrier support information may be transmitted to an unspecified MS. This multi-carrier support information may be transferred even to another MS that does not require multi-carrier support information. That is, in the case where the BS transmits such multi-carrier support information even to a specific MS that does not support multi-carrier, unnecessary information transmission overhead may be generated.

A method for transmitting a unicast message to an MS according to still another embodiment of the present invention will hereinafter be described in detail. In this case, the unicast message is adapted to transmit information of a legacy system or a multi-carrier support system (i.e., multi-carrier support information), and/or information of a heterogeneous network.

While an MS performs initial network entry, a BS may transmit legacy system-associated information or multi-carrier support information to the MS using a unicast message. For example, the BS may include multi-carrier support information and/or heterogeneous network information in a ranging response (RNG-RSP) message, a subscriber MS basic capability response (SBC-RSP) message, and/or a registration response (REG-RSP) message, such that it is able to transmit the resultant response message to the MS. In addition, upon completion of the initial network entry of the MS, the BS may transmit multi-carrier support information or heterogeneous network information to the MS using an additional unicast message.

The above-mentioned embodiment of the present invention has an advantage in that information required for a specific MS can be transmitted more effectively than the other embodiment in which multi-carrier support information and/or heterogeneous network information are/is transmitted using the BCH or the system information transmission message.

The unicast transmission scheme for transmitting multi-carrier support information may be used even when the above-mentioned legacy system information is transmitted. In a multi-carrier system supporting the legacy system, if the MS requests legacy system information from the BS, or if the BS transmits legacy system information to the MS, the BS can transmit the legacy system information to a specific MS using the unicast message.

For example, it is assumed that the MS is present in the 802.16m BS supporting the legacy system. If the MS moves from the 802.16m system zone to the 802.16e system (legacy) zone, the MS may transmit a unicast request message requesting zone-switching to the BS.

Upon receiving the unicast request message for the zone switching from the MS, the BS may transmit a unicast response message including switching indication information to the unicast request message to the MS. The BS may include legacy system information (e.g., DCD and UCD) in the unicast response message (i.e., a response message to the zone switching request) to the MS, and transmit the resultant unicast response message to the MS.

Otherwise, the BS may determine whether it is necessary to perform zone switching of an unsolicited corresponding MS. If the BS decides to perform zone switching of the unsolicited MS, the BS may transmit a zone switching response message to the MS, wherein the zone switching response message includes switching command information, information associated with the zone switching, and legacy system information.

In accordance with another method, the MS may receive system information (e.g., DCD/UCD) of a legacy system from the BS. Thereafter, if information of the legacy system (e.g., MS's zone switching, etc.) is needed, the MS may use pre-received legacy system information. In this case, if the legacy system is changed to another, the MS may request only the changed legacy system information. For this operation, when the MS transmits a legacy system information request message (or a zone switching request message) to the BS, the MS includes change count information of its own legacy system information in a corresponding message and transmits the resultant message to the BS.

The BS can confirm change count information contained in the legacy system information request message. Therefore, the BS includes only the changed legacy system support information in the legacy system information response message, and transmits the resultant legacy system information response message. For this operation, it is preferable that the BS have only system information corresponding to the change count.

For example, if the change count value has the size of 8 bits, the BS may have system information about 256 change counts. The MS may receive legacy system information only once at an initial entry mode, or may periodically receive the legacy system information at intervals of a predetermined time.

If the MS periodically receives the legacy system information, it is preferable that the reception period be received in such a manner that the MS can receive updated legacy system information before the completion of change counter reconfiguration (e.g., assuming that the change count of the periodically received legacy system information has the size of 8 bits, before the counter is increased by the size of 256 bits and returns to the size of 8 bits). For example, assuming that a DCD/UCD transmission interval is 0.5 second, it is necessary for the reception period to be shorter than 0.5*256 seconds. The BS can explicitly inform the MS of timer information of the reception period using a unicast or broadcast scheme.

The BS may inform the MS of system information (e.g., DCD/UCD) of the legacy system in the form of a pointer. For example, the MS may receive a pointer that indicates a transmission time or position of legacy system information from the BS. In this case, the MS may acquire legacy system information at the transmission time or position contained in the pointer. In addition, the MS may transmit a confirmation message of the pointer to the BS.

As described above, information of frame structures shown in FIGS. 7 to 16 may be transmitted to the MS using any one of the methods described in FIGS. 5, 6, and 7. That is, the BS may transmit frame structure information (See Tables 1 to 11) of the legacy system to the MS using a BCH or an MAC management message (e.g., a DCD and/or a UCD).

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

As apparent from the above description, exemplary embodiments of the present invention have the following effects.

First, according to the embodiments of the present invention, data communication can be efficiently carried out using a variety of frame structures.

Second, the embodiments of the present invention use a frame structure that supports a new system (e.g., a multi-carrier system) and a legacy system (e.g., a single-carrier system), such that compatibility between the new system and the legacy system can be maintained.

Third, the embodiments of the present invention use a variety of methods for transmitting information that allows a mobile station to acquire a frame structure, when a base station supports a legacy system, such that the mobile station can correctly receive resources.

Fourth, the embodiments of the present invention use an efficient frame structure for information to be acquired by a mobile station, such that information can be transmitted to the mobile station using a smaller amount of resources than a legacy system.

The embodiments of the present invention are applicable to various wireless access systems including a $3^{rd}$ Generation Partnership Project (3GPP) system, a 3GPP2 system, and/or an Institute of Electrical and Electronic Engineers (IEEE) 802.xx system. Besides these wireless access systems, the embodiments of the present invention are applicable to all technical fields in which the wireless access systems are applied.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting information supporting a legacy system, the method comprising:
    constructing, by a base station, a frame structure for supporting the legacy system; and
    transmitting, from the base station to a mobile terminal, allocation information of the frame structure via a broadcast channel (BCH) of a frame header,
    wherein the allocation information includes a first indicator for indicating whether a base station supports the legacy system, first information for indicating a ratio of first sub-frames supporting the legacy system among downlink and uplink sub-frames, bandwidth information of the first sub-frames, a second indicator for indicating multiplexing information of uplink sub-frames from among the first sub-frames, and second information about a center frequency of the first sub-frames.

2. The method according to claim 1, wherein the first information is information of a ratio between the first sub-frames and second sub-frames at each of the downlink and uplink sub-frames, wherein the second sub-frames are not supporting the legacy system.

3. The method according to claim 1, wherein the first information is information of a ratio between the first sub-frames and second sub-frames among sub-frames contained in a super-frame, wherein the second sub-frames are not supporting the legacy system.

4. The method according to claim 1, wherein:
    the second indicator indicates that the uplink sub-frames from among the first sub-frames is multiplexed using at least one of a Time Division Multiplexing (TDM) scheme and a Frequency Division Multiplexing (FDM) scheme, and
    the center frequency is represented by a relative value on the basis of a center frequency of a current carrier.

5. The method according to claim 4, wherein the relative value is represented in the form of position information.

6. The method according to claim 4, wherein the relative value is represented in the form of frequency offset information.

7. The method according to claim 4, wherein the allocation information further includes third information indicating the number of uplink resource blocks allocated to the first sub-frames, if the second indicator indicates that the uplink sub-frames from among the first sub-frames are multiplexed using the Frequency Division Multiplexing (FDM) scheme.

8. The method according to claim 1,
wherein a region of the broadcast channel (BCH) includes a primary BCH (PBCH) and a secondary BCH (SBCH), and
wherein the allocation information is transmitted to the mobile station through one of the PBCH and the SBCH.

9. The method according to claim 1, wherein the allocation information is contained in a system information transfer message, and is transmitted to the mobile station.

10. The method according to claim 1, wherein:
the frame structure is a super-frame structure, and
the frame header is a super-frame header (SFH).

11. A method for receiving information supporting a legacy system, the method comprising:
receiving, by a mobile station, a frame header including allocation information of a frame supporting the legacy system from a base station; and
receiving, by the mobile station, a control message through a region supporting the legacy system indicated by the frame header,
wherein the allocation information is transmitted through a secondary broadcast channel (SBCH) contained in the frame header, and
wherein the allocation information includes a first indicator for indicating whether a base station supports the legacy system, first information for indicating a ratio of first sub-frames supporting the legacy system among downlink and uplink sub-frames, bandwidth information of the first sub-frames, a second indicator for indicating multiplexing information of uplink sub-frames from among the first sub-frames, and second information about a center frequency of the first sub-frames.

* * * * *